(12) United States Patent
Takewaki

(10) Patent No.: US 11,945,970 B2
(45) Date of Patent: Apr. 2, 2024

(54) WATER REPELLENT COMPOSITION

(71) Applicant: SHIN-ETSU CHEMICAL CO., LTD., Tokyo (JP)

(72) Inventor: Kazuyuki Takewaki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 794 days.

(21) Appl. No.: 16/970,390

(22) PCT Filed: Feb. 14, 2019

(86) PCT No.: PCT/JP2019/005185
§ 371 (c)(1),
(2) Date: Aug. 17, 2020

(87) PCT Pub. No.: WO2019/181289
PCT Pub. Date: Sep. 26, 2019

(65) Prior Publication Data
US 2021/0115264 A1    Apr. 22, 2021

(30) Foreign Application Priority Data

Mar. 22, 2018   (JP) ................................. 2018-055026

(51) Int. Cl.
*C08L 83/04* (2006.01)
*C09D 5/02* (2006.01)
*C09D 183/04* (2006.01)

(52) U.S. Cl.
CPC .............. *C09D 5/022* (2013.01); *C08L 83/04* (2013.01); *C09D 183/04* (2013.01)

(58) Field of Classification Search
CPC ............................. C09D 183/04; C08L 83/00
See application file for complete search history.

(56) References Cited

U.S. PATENT DOCUMENTS

| | | | |
|---|---|---|---|
| 6,323,268 B1 | 11/2001 | Fisher et al. | |
| 2007/0116969 A1* | 5/2007 | Liu | C08G 77/44 524/588 |
| 2011/0160376 A1* | 6/2011 | Hori | C08G 77/44 525/477 |

FOREIGN PATENT DOCUMENTS

| | | | |
|---|---|---|---|
| CN | 1863845 | A | 11/2006 |
| CN | 102089356 | A | 6/2011 |
| JP | H07-053922 | A | 2/1995 |
| JP | 3313255 | B2 | 8/2002 |
| JP | 3475128 | B2 * | 12/2003 |
| JP | 2004-502017 | A | 1/2004 |
| JP | 2004-339305 | A | 12/2004 |
| JP | 3769710 | B2 | 4/2006 |
| JP | 2008-013719 | A | 1/2008 |
| JP | 4334260 | B2 | 9/2009 |
| JP | 2010-037557 | A | 2/2010 |
| JP | 2013-116972 | A | 6/2013 |
| KR | 2011-0036832 | A | 4/2011 |
| WO | 2010/098448 | A1 | 9/2010 |

OTHER PUBLICATIONS

Sep. 22, 2020 International Preliminary Report on Patentability issued in International Patent Application No. PCT/JP2019/005185.
Feb. 2, 2023 Office Action and Search Report issued in Chinese Patent Application No. 201980014012.0.
May 7, 2019 International Search Report issued in International Patent Application No. PCT/JP2019/005185.
Nov. 22, 2021 Extended Search Report issued in European Patent Application No. 19772353.9.
Jul. 7, 2022 Office Action issued in Taiwanese Patent Application No. 108105598.
Mar. 16, 2021 Office Action issued in Japanese Patent Application No. 2018-55026.
Jan. 17, 2024 Office Action issued in Korean Patent Application No. 10-2020-7024379.

* cited by examiner

*Primary Examiner* — Peter A Salamon
(74) *Attorney, Agent, or Firm* — Oliff PLC

(57) ABSTRACT

A water repellent composition containing a component that is a condensation reaction product between: an organopolysiloxane shown by the following general formula (1) and having a hydroxyl group or an alkoxy group at both terminals of a molecular chain of the organopolysiloxane, $(R^2O)R^1_2SiO-(R^1_2SiO)_m-SiR^1_2(OR^2)$ (1); and a trialkylsiloxysilicate containing $R^1_3SiO_{1/2}$ an unit, an $SiO_2$ unit, and a siloxane unit having a hydroxyl group bonded to a silicon atom, where a molar ratio of the $R^1_3SiO_{1/2}$ unit/the $SiO_2$ unit is 0.6 to 1.3, and a content of the hydroxyl group is 0.1 or more and less than 2.0 mass %. A water repellent composition which is used as a water repellent in water repellency, particularly suitably applied as an agent for paintwork and a glass surface of an automobile, so as to impart initial water repellency and long-lasting water repellency.

6 Claims, No Drawings

WATER REPELLENT COMPOSITION

TECHNICAL FIELD

The present invention relates to a water repellent composition which is effectively used as a water repellent excellent in water repellency, particularly suitably applied as an agent for paintwork and a glass surface of an automobile, so as to impart favorable initial water repellency and long-lasting water repellency.

BACKGROUND ART

Conventionally, in coating the surface of a vehicle such as an automobile to impart water repellency, an aqueous emulsion mainly containing amino-modified polysiloxane has been applied. In the amino-modified polysiloxane, some methyl groups of dimethylpolysiloxane are substituted with an aminoalkyl group or an aminoalkyl-substituted aminoalkyl group. When applied to a vehicle surface, such amino-modified polysiloxane is adsorbed to the vehicle surface by the amino group, so that long-lasting water repellent performance can be imparted as compared with dimethylpolysiloxane.

In a conventional use method, amino-modified polysiloxane is emulsified with a nonionic surfactant and used as an aqueous emulsion. Further, to enhance the adsorbability of amino-modified polysiloxane, Patent Document 1 discloses a coating agent of an aqueous emulsion containing a specific cationic surfactant as an additional component.

Moreover, Patent Document 2 discloses a composition for imparting gloss and water repellency, the composition containing a mixture of amino-modified polysiloxane and dimethylpolysiloxane which are respectively emulsified with nonionic surfactants having specific HLBs.

However, due to the hydrophilicity of the amino groups, amino-modified polysiloxanes have a problem of lower water repellent performance than that of dimethylpolysiloxane.

As another method, there is known a technique for imparting long-lasting water repellent performance by using trialkylsiloxysilicate as an additional component. For example, it has been publically known that long-lasting water repellent performance is imparted by combining trialkylsiloxysilicate with organopolysiloxane and/or amino-modified polysiloxane.

As conventional examples using trialkylsiloxysilicate, there have been disclosed: a water repellent for washing containing an emulsion in which a mixture solution of trimethylsiloxysilicate and organopolysiloxane is dispersed in water, an amino-modified polydimethylsiloxane, an organic acid, and an alkylglucoside (Patent Document 3); a car-polishing emulsion containing an amino-modified silicone oil having a specific structure, a surfactant, water, and trimethylsiloxysilicate (Patent Document 4); etc. However, the performances are not sufficient, and further property improvements are demanded.

CITATION LIST

Patent Literature

Patent Document 1: JP 3313255B
Patent Document 2: JP 4334260B
Patent Document 3: JP 3769710B
Patent Document 4: JP 2004-339305A

SUMMARY OF INVENTION

Technical Problem

The present invention has been made in view of the above-described circumstances. An object of the present invention is to provide a water repellent composition which is effectively used as a water repellent excellent in water repellency, particularly suitably applied as an agent for paintwork and a glass surface of an automobile, so as to impart favorable initial water repellency and long-lasting water repellency.

Solution to Problem

To achieve the object, the present invention provides a water repellent composition comprising
(A) a component that is a condensation reaction product between:
  (a) an organopolysiloxane shown by the following general formula (1) and having a hydroxyl group or an alkoxy group at both terminals of a molecular chain of the organopolysiloxane, $$(R^2O)R^1{}_2SiO-(R^1{}_2SiO)_m-SiR^1{}_2(OR^2) \quad (1)$$
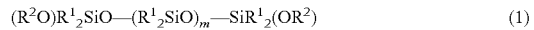

wherein $R^1$ represents an unsubstituted or substituted monovalent hydrocarbon group having 1 to 10 carbon atoms, $R^2$ represents a hydrogen atom or $R^1$, and "m" represents an integer of $5 \leq m \leq 2,500$; and
  (b) a trialkylsiloxysilicate containing an $R^1{}_3SiO_{1/2}$ unit, an $SiO_2$ unit, and a siloxane unit having a hydroxyl group bonded to a silicon atom, wherein $R^1$ is as defined above, a molar ratio of the $R^1{}_3SiO_{1/2}$ unit/the $SiO_2$ unit is 0.6 to 1.3, and a content of the hydroxyl group is 0.1 or more and less than 2.0 mass %.

The inventive water repellent composition is a water repellent composition effectively used as a water repellent excellent in water repellency, particularly suitably applied as an agent for paintwork and a glass surface of an automobile, so as to impart favorable initial water repellency and long-lasting water repellency.

Moreover, the inventive water repellent composition preferably comprises (B) a component that is an organopolysiloxane shown by the following general formula (2), $$R^1{}_3SiO-(R^1{}_2SiO)_n-SiR^1{}_3 \quad (2)$$

wherein $R^1$ is as defined above, and "n" represents an integer of $5 \leq n \leq 1,000$.

The water repellent composition containing such a component (B) imparts more favorable initial water repellency and long-lasting water repellency.

Further, the inventive water repellent composition preferably comprises an emulsion wherein the component (A) and the component (B) in a total amount of 100 parts by mass are emulsified by 2 to 50 parts by mass of (C) a surfactant and 10 to 2,000 parts by mass of (D) water.

Additionally, the emulsion preferably has an average particle size of 100 to 1,000 nm.

The inventive water repellent composition may be an emulsion composition as described above.

Furthermore, the present invention is preferably used for a body surface of an automobile.

In this manner, the inventive water repellent composition is suitably applied as an agent for a body surface of an automobile.

Advantageous Effects of Invention

As described above, the inventive water repellent composition successfully provides a water repellent composition which has excellent water repellency, and which is capable of imparting favorable initial water repellency and long-lasting water repellency to a vehicle body particularly when used as an agent for paintwork and a glass surface of an automobile.

DESCRIPTION OF EMBODIMENTS

As described above, there have been demands for the development of a water repellent composition which is effectively used as a water repellent having excellent water repellency, particularly suitably applied as an agent for paintwork and a glass surface of an automobile, and which imparts favorable initial water repellency and long-lasting water repellency.

The present inventor and colleagues have earnestly studied to achieve the above object and consequently found that the following composition containing (A) a condensation reaction product between an organopolysiloxane defined by (a) and a trialkylsiloxysilicate defined by (b) results in a water repellent composition having excellent water repellency. This finding has led to the completion of the present invention.

Accordingly, the present invention is a water repellent composition comprising (A) a component that is a condensation reaction product between:
(a) an organopolysiloxane shown by the following general formula (1) and having a hydroxyl group or an alkoxy group at both terminals of a molecular chain of the organopolysiloxane,

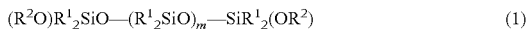

$(R^2O)R^1{}_2SiO—(R^1{}_2SiO)_m—SiR^1{}_2(OR^2)$  (1)

wherein $R^1$ represents an unsubstituted or substituted monovalent hydrocarbon group having 1 to 10 carbon atoms, $R^2$ represents a hydrogen atom or $R^1$, and "m" represents an integer of $5 \leq m \leq 2,500$; and (b) a trialkylsiloxysilicate containing an $R^1{}_3SiO_{1/2}$ unit, an $SiO_2$ unit, and a siloxane unit having a hydroxyl group bonded to a silicon atom, wherein $R^1$ is as defined above, a molar ratio of the $R^1{}_3SiO_{1/2}$ unit/the $SiO_2$ unit is 0.6 to 1.3, and a content of the hydroxyl group is 0.1 or more and less than 2.0 mass %.

Hereinafter, the present invention will be described in more details, but the present invention is not limited thereto. First, description will be given of (a) an organopolysiloxane, (b) a trialkylsiloxysilicate, and (A) a condensation reaction product therebetween which constitute the present invention.

<(A) Condensation Reaction Product>
[(a) Organopolysiloxane]

In the inventive water repellent composition, (a) is an organopolysiloxane shown by the general formula (1) and having a hydroxyl group or an alkoxy group at both terminals of the molecular chain of the organopolysiloxane,

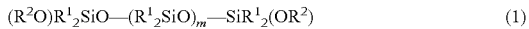

$(R^2O)R^1{}_2SiO—(R^1{}_2SiO)_m—SiR^1{}_2(OR^2)$  (1)

where $R^1$ is an unsubstituted or substituted monovalent hydrocarbon group having 1 to 10 carbon atoms, $R^2$ is a hydrogen atom or $R^1$, and "m" is an integer that satisfies $5 \leq m \leq 2,500$.

Examples of $R^1$ include alkyl groups such as a methyl group, an ethyl group, an n-propyl group, an isopropyl group, an n-butyl group, an isobutyl group, an n-hexyl group, an n-octyl group, a 2-ethylhexyl group, and an n-decyl group; cycloalkyl groups such as a cyclopropyl group and a cyclohexyl group; aryl groups such as a phenyl groups and a tolyl group; these groups in which a part or all of hydrogen atoms bonded to carbon atoms are substituted with a cyano group, such as an cyanoethyl groups; etc. A methyl group and a phenyl group are particularly preferable. Further preferably, 70% or more of all $R^1$'s are methyl groups.

Examples of $R^2$ include a hydrogen atom and the groups exemplified above as $R^2$.

This organopolysiloxane (a) is preferably in an oil state. "m" is an integer and the number satisfies $5 \leq m \leq 2,500$. If "m" is less than 5, the initial water repellency and long-lasting water repellency of the water repellent composition are impaired. Meanwhile, if "m" exceeds 2,500, the condensation reaction product (A) has such a high viscosity that the handleability of the condensation reaction product (A) and the coatability of the water repellent composition are impaired. More preferably, "m" satisfies a range of $8 \leq m \leq 2,000$. Note that two or more kinds of the organopolysiloxane (a) may be used in combination.

[(b) Trialkylsiloxysilicate]

(b) is a trialkylsiloxysilicate containing an $R^1{}_3SiO_{1/2}$ unit, an $SiO_2$ unit, and a siloxane unit having a hydroxyl group bonded to a silicon atom. The value of the $R^1{}_3SiO_{1/2}$ unit/the $SiO_2$ unit (molar ratio) is 0.6 to 1.3, and the content of the hydroxyl group is 0.1 mass % or more and less than 2.0 mass %. If the molar ratio of $R^1{}_3SiO_{0.5}$ unit/$SiO_2$ unit is less than 0.6, the long-lasting water repellency of the water repellent composition is impaired. If the molar ratio exceeds 1.3, the initial water repellency is impaired. Moreover, (b) contains a hydroxyl group bonded to a silicon atom, and the content of 0.1 mass % or more and less than 2.0 mass % is sufficient.

The siloxane unit containing a hydroxyl group bonded to a silicon atom mainly includes an (HO) $SiO_{3/2}$ unit, and the other forms such as an $(HO)_2SiO_{2/2}$ unit and an $(HO)_3SiO_{1/2}$ unit are present in the trialkylsiloxysilicate (b).

Further, some $SiO_2$ units may be $(R^1O)SiO_{3/2}$. Moreover, it is also possible to contain an $R^1{}_2SiO$ unit and/or an $R'SiO_{3 1 2}$ unit such that the proportion thereof accounts for 20% or less of all the silicon atoms by mole in the component (b). Note that two or more kinds of the trialkylsiloxysilicate (b) may be used in combination.

[Condensation Method]

To perform the condensation reaction, a mixture of the components (a), (b) is allowed to react using an alkaline catalyst at room temperature or under reflux, and may be as necessary neutralized. In this event, a solvent can also be used.

Examples of the solvent include aromatic solvents such as toluene and xylene; aliphatic solvents such as hexane and octane; ketone-based solvents such as methyl ethyl ketone and methyl isobutyl ketone; ester-based solvents such as ethyl acetate and isobutyl acetate; and ether-based solvents such as diisopropyl ether and 1,4-dioxane. A solvent mixture thereof can also be used.

In the reaction, a blending ratio (mass ratio) of the component (a) and the component (b) is preferably 20/80 to 80/20, more preferably 30/70 to 70/30. Moreover, an appropriate reaction time of the condensation reaction is preferably 1 hour to 20 hours, and may exceed 20 hours.

Examples of the alkaline catalyst that can be used include alkali metal salts such as sodium hydroxide, potassium hydroxide, sodium carbonate, potassium carbonate, and sodium hydrogen carbonate; alkali metal silanolates such as sodium silanolate and potassium silanolate; alkali metal alkoxides such as sodium methoxide and potassium methoxide; amines such as triethylamine, diethylamine, and aniline; ammonia gas and ammonia water; etc. The amount of the catalyst is preferably 0.001 to 1 mass % relative to a total amount of the components (a), (b).

After the reaction is completed, a neutralizer may be added as necessary to neutralize the alkaline catalyst. Examples of the neutralizer include acidic gases such as hydrogen chloride and carbon dioxide; organic acids such as acetic acid, octylic acid, and citric acid; mineral acids such as hydrochloric acid, sulfuric acid, and phosphoric acid; etc. When ammonia gas, ammonia water, or an amine compound having a low boiling point is used as the alkaline catalyst, the alkaline catalyst may be distilled off by heating or passing an inert gas such as nitrogen.

The condensation reaction product (A) preferably has a viscosity at 25° C. of 100 to 1,000,000 mPa·s. When the viscosity is 100 mPa·s or more, the water repellent composition has better initial water repellency and long-lasting water repellency. Moreover, when the viscosity is 1,000,000 mPa·s or less, the handleability of the condensation reaction product (A) and the coatability of the water repellent composition are favorable.

<(B) Organopolysiloxane>

The inventive water repellent composition may further contain (B) an organopolysiloxane shown by a general formula (2):

where $R^1$ is an unsubstituted or substituted monovalent hydrocarbon group having 1 to 10 carbon atoms as defined above, and "n" is an integer satisfying $5 \leq n \leq 1,000$. When "n" is 5 or more, the water repellent composition has better initial water repellency and long-lasting water repellency. Moreover, when "n" is 1,000 or less, the viscosity of a mixture of the component (A) and the component (B) is not increased, so that the handleability thereof and the coatability of the water repellent composition are favorable. More preferably, "n" satisfies a range of $8 \leq n \leq 800$. Additionally, two or more kinds of the component (B) may be used in combination.

The organopolysiloxane (B) may be mixed during the condensation reaction between the components (a), (b), or may be additionally added after the condensation reaction. Even when mixed during the condensation reaction, the component (B) does not intervene in the condensation reaction because the component (B) does not contain a hydroxyl group or an alkoxy group.

<(C) Surfactant>

A surfactant as a component (C) is not particularly limited, as long as it allows the components (A) and (B) to emulsify and disperse in water. Examples of the surfactant include polyoxyethylene alkyl ethers, polyoxyethylene oxypropylene alkyl ethers, polyoxyethylene fatty acid esters, etc. From the viewpoint of the emulsion stability, polyoxyethylene alkyl ethers and polyoxyethylene oxypropylene alkyl ethers are particularly preferable.

Specific examples of these include polyoxyethylene octyl ether, polyoxyethylene nonyl ether, polyoxyethylene decyl ether, polyoxyethylene oxypropylene decyl ether, polyoxyethylene lauryl ether, polyoxyethylene oxypropylene lauryl ether, polyoxyethylene tridecyl ether, polyoxyethylene oxypropylene tridecyl ether, polyoxyethylene cetyl ether, polyoxyethylene stearyl ether, polyoxyethylene oleyl ether, etc. As the component (C), one of these nonionic surfactants can be used alone, or two or more thereof can be used in combination.

Alternatively, it is also possible to use anionic surfactants such as alkyl sulfates, alkylbenzene sulfonates, alkyl sulfosuccinates, polyoxyethylene alkyl ether sulfates, and polyoxyethylene alkyl phenyl ether sulfates; cationic surfactants such as quaternary ammonium salts and alkylamine acetates; amphoteric surfactants such as alkylbetaines and alkylimidazolines; etc.

The component (C) is added in an amount of preferably 2 to 50 parts by mass relative to 100 parts by mass of a total amount of the component (A) and the component (B). When the amount of the component (C) is 2 parts by mass or more, the emulsion has favorable stability. When the amount is 50 parts by mass or less, more favorable initial water repellency and long-lasting water repellency are obtained. The amount is more preferably 3 to 40 parts by mass, further preferably 4 to 30 parts by mass.

<(D) Water>

The emulsion can be prepared by blending and mixing the above-described the components (A) to (C) with water as a component (D), followed by emulsification and dispersion according to a conventional method. In this case, the content of water as the component (D) is preferably 10 to 2,000 parts by mass, particularly preferably 50 to 1,000 parts by mass, relative to 100 parts by mass of the total amount of the component (A) and the component (B).

Further, the resulting emulsion preferably has an average particle size of 100 nm to 1,000 nm on a volume basis. Note that, in the present invention, the average particle size can be measured with a laser diffraction/scattering particle size distribution analyzer (LA-960) manufactured by HORIB Ltd.

<Other Components>

Besides the above-described components (A) to (D), various additives can be blended into the inventive water repellent composition.

For example, depending on the purpose, it is possible to add a thickener, an antifreezing agent, a preservative, an antirust, an antioxidant, a UV absorber, solvent, cyclic siloxane such as decamethylcyclopentasiloxane, volatile siloxane such as hexamethyldisiloxane, octamethyltrisiloxane, and 1,1,1,5,5,5-hexamethyl-3-methyl-3-[(trimethylsilyl)oxy]-trisiloxane; etc.

Note that the component (A) and the component (B) can be used in the form of an emulsion after emulsified with a surfactant of the component (C) and water of the component (D).

The inventive water repellent composition can be used by: directly applying the composition solution or a diluted solution thereof to a targeted base material, and then rubbing the applied surface with a cloth or the like. Moreover, in coating a body surface of an automobile, the inventive water repellent composition can be easily used for water repellency coating treatment on the vehicle not only by the aforementioned method but also by using an automated car wash machine, for example, a gate-form car wash machine, a continuous gate-form car wash machine, a spray-type car wash machine, or the like. The concentration of the water repellent in the application or spraying is not particularly limited. Normally, it is desirable to dilute the inventive water repellent composition with water, a solvent, or the like such that the total concentration of the component (A) and the component (B) is about 0.01 to 10%. The inventive water repellent composition is capable of imparting water repellency, glossiness, smoothness, and so forth, persistently over a long period of time to a targeted base material, for example, paintwork and glass surface of a vehicle, etc.

EXAMPLE

Hereinafter, the present invention will be specifically described with reference to Production Examples, Examples, and Comparative Examples. However, the present invention is not limited to the following Examples. Unless otherwise noted, the blended amounts in Table 1 are expressed in parts by mass. First, mixtures of the condensation reaction product (A) and the organopolysiloxane (B) were prepared.

[A-1]

A mixture was prepared from 18 parts by mass of dimethylpolysiloxane having hydroxy groups at both terminals shown by (HO) $(CH_3)_2SiO-[(CH_3)_2SiO]_{1500}-Si(CH_3)_2$ (OH), 40 parts by mass of dimethylpolysiloxane shown by $(CH_3)_3SiO-[(CH_3)_2SiO]_{10}-Si(CH_3)_3$, and 42 parts by mass of trimethylsiloxysilicate containing $(CH_3)_3SiO_{1/2}$ unit and $SiO_2$ unit [$(CH_3)_3SiO_{1/2}$ unit/$SiO_2$ unit=0.85 (molar ratio), the content of hydroxyl groups bonded to silicon atom was 1.5 mass %, and the hydroxyl groups bonded to silicon atom were present as (HO) $SiO_{3/2}$ unit, $(HO)_2SiO_{2/2}$ unit, or $(HO)_3SiO_{1/2}$ unit]. The mixture was subjected to the condensation reaction between the dimethylpolysiloxane having hydroxy groups at both terminals and the trimethylsiloxysilicate at 25° C. for 15 hours in 18 parts by mass of toluene by adding 0.5 parts by mass of ammonia water. Then, the toluene and water generated by the condensation reaction were distilled off at normal pressure. Thus, a mixture (A-1) was obtained.

* Physical properties of A-1: viscosity=5,540 mPa·s, refractive index=1.406, specific gravity=1.035, volatile content (105° C./3 h)=1.9%

[A-2]

A mixture was prepared from 18 parts by mass of dimethylpolysiloxane having hydroxy groups at both terminals shown by (HO) $(CH_3)_2SiO-[(CH_3)_2SiO]_{280}-Si(CH_3)_2$ (OH), 40 parts by mass of dimethylpolysiloxane shown by $(CH_3)_3SiO-[(CH_3)_2SiO]_{20}-Si(CH_3)_3$, and 42 parts by mass of trimethylsiloxysilicate containing $(CH_3)_3SiO_{1/2}$ unit and $SiO_2$ unit [$(CH_3)_3SiO_{1/2}$ unit/$SiO_2$ unit=0.85 (molar ratio), the content of hydroxyl groups bonded to silicon atom was 1.5 mass %, and the hydroxyl groups bonded to silicon atom were present as $(HO)SiO_{3/2}$ unit, $(HO)_2SiO_{2/2}$ unit, or $(HO)_3SiO_{2/2}$ unit]. The mixture was subjected to the condensation reaction between the dimethylpolysiloxane having hydroxy groups at both terminals and the trimethylsiloxysilicate at 25° C. for 15 hours in 18 parts by mass of toluene by adding 0.5 parts by mass of ammonia water. Then, the toluene and water generated by the condensation reaction were distilled off at normal pressure. Thus, a mixture (A-2) was obtained.

* Physical properties of A-2: viscosity=2,400 mPa·s, refractive index=1.406, specific gravity=1.036, volatile content (105° C./3 h)=1.9%

[A-3]

A mixture was prepared from 24 parts by mass of dimethylpolysiloxane having hydroxy groups at both terminals shown by (HO) $(CH_3)_2SiO-[(CH_3)_2SiO]_{1500}-Si(CH_3)_2$ (OH), 40 parts by mass of dimethylpolysiloxane shown by $(CH_3)_3SiO-[(CH_3)_2SiO]_{10}-Si(CH_3)_3$, and 36 parts by mass of trimethylsiloxysilicate containing $(CH_3)_3SiO_{1/2}$ unit and $SiO_2$ unit [$(CH_3)_3SiO_{1/2}$ unit/$SiO_2$ unit=0.85 (molar ratio), the content of hydroxyl groups bonded to silicon atom was 1.5 mass %, and the hydroxyl groups bonded to silicon atom were present as $(HO)SiO_{3/2}$ unit, $(HO)_2SiO_{2/2}$ unit, or $(HO)_3SiO_{1/2}$ unit]. The mixture was subjected to the condensation reaction between the dimethylpolysiloxane having hydroxy groups at both terminals and the trimethylsiloxysilicate at 25° C. for 15 hours in 15 parts by mass of toluene by adding 0.5 parts by mass of ammonia water. Then, the toluene and water generated by the condensation reaction were distilled off at normal pressure. Thus, a mixture (A-3) was obtained.

* Physical properties of A-3: viscosity=10,970 mPa·s, refractive index=1.406, specific gravity=1.023, volatile content (105° C./3 h)=1.9%

[A-4]

A mixture was prepared from 18 parts by mass of dimethylpolysiloxane having methoxy groups at both terminals shown by $(CH_3O)(CH_3)_2SiO-[(CH_3)_2SiO]_{1500}-Si(CH_3)_2(OCH_3)$, 40 parts by mass of dimethylpolysiloxane shown by $(CH_3)_3SiO-[(CH_3)_2SiO]_{10}-Si(CH_3)_3$, and 42 parts by mass of trimethylsiloxysilicate containing $(CH_3)_3SiO_{1/2}$ unit and $SiO_2$ unit [$(CH_3)_3SiO_{1/2}$ unit/$SiO_2$ unit=0.85 (molar ratio), the content of hydroxyl groups bonded to silicon atom was 1.5 mass %, and the hydroxyl groups bonded to silicon atom were present as $(HO)SiO_{3/2}$ unit, $(HO)_2SiO_{2/2}$ unit, or $(HO)_3SiO_{2/2}$ unit]. The mixture was subjected to the condensation reaction between the dimethylpolysiloxane having methoxy groups at both terminals and the trimethylsiloxysilicate at 25° C. for 15 hours in 18 parts by mass of toluene by adding 0.5 parts by mass of ammonia water. Then, the toluene, and methanol and water generated by the condensation reaction were distilled off at normal pressure. Thus, a mixture (A-4) was obtained.

* Physical properties of A-4: viscosity=5,850 mPa·s, refractive index=1.406, specific gravity=1.035, volatile content (105° C./3 h)=1.5%

[A-5]

A mixture was prepared from 18 parts by mass of dimethylpolysiloxane having hydroxy groups at both terminals shown by (HO) $(CH_2)_2SiO-[(CH_2)_2SiO]_{1500}-Si(CH_3)_2$ (OH), 40 parts by mass of dimethylpolysiloxane shown by $(CH_3)_3SiO-[(CH_3)_2SiO]_{20}-Si(CH_3)_3$, and 42 parts by mass of trimethylsiloxysilicate containing $(CH_3)_3SiO_{1/2}$ unit and $SiO_2$ unit [$(CH_3)_3SiO_{2/2}$ unit/$SiO_2$ unit=0.70 (molar ratio), the content of hydroxyl groups bonded to silicon atom was 0.5 mass %, and the hydroxyl groups bonded to silicon atom were present as $(HO)SiO_{3/2}$ unit, $(HO)_2SiO_{2/2}$ unit, or $(HO)_3SiO_{2/2}$ unit]. The mixture was subjected to the condensation reaction between the dimethylpolysiloxane having hydroxy groups at both terminals and the trimethylsiloxysilicate at 25° C. for 15 hours in 18 parts by mass of toluene by adding 0.5 parts by mass of ammonia water. Then, the toluene and water generated by the condensation reaction were distilled off at normal pressure. Thus, a mixture (A-5) was obtained.

* Physical properties of A-5: viscosity=2,780 mPa·s, refractive index=1.406, specific gravity=1.036, volatile content (105° C./3 h)=2.1%

[A-6]

A mixture was prepared from 18 parts by mass of dimethylpolysiloxane having hydroxy groups at both terminals shown by (HO) $(CH_3)_2SiO-[(CH_3)_2SiO]_{1500}-Si(CH_3)_2$ (OH), 40 parts by mass of dimethylpolysiloxane shown by $(CH_3)_3SiO-[(CH_3)_2SiO]_{10}-Si(CH_3)_3$, and 42 parts by mass of trimethylsiloxysilicate containing $(CH_3)_3SiO_{1/2}$ unit and $SiO_2$ unit [$(CH_3)_3SiO_{1/2}$ unit/$SiO_2$ unit=0.70 (molar ratio), the content of hydroxyl groups bonded to silicon atom was 1.7 mass %, and the hydroxyl groups bonded to silicon atom were present as $(HO)SiO_{3/2}$ unit, $(HO)_2SiO_{2/2}$ unit, or $(HO)_3SiO_{1/2}$ unit]. The mixture was subjected to the condensation reaction between the dimethylpolysiloxane having hydroxy groups at both terminals and the trimethylsiloxysilicate at 25° C. for 15 hours in 18 parts by mass of toluene by adding 0.5 parts by mass of ammonia water. Then, the toluene and water generated by the condensation reaction were distilled off at normal pressure. Thus, a mixture (A-6) was obtained.

* Physical properties of A-6: viscosity=7,480 mPa·s, refractive index=1.406, specific gravity=1.035, volatile content (105° C./3 h)=1.4%

[A-7]

A mixture was prepared from 18 parts by mass of dimethylpolysiloxane having hydroxy groups at both terminals shown by (HO) $(CH_3)_2SiO—[(CH_3)_2SiO]_{1500}—Si(CH_3)_2$ (OH), 40 parts by mass of dimethylpolysiloxane shown by $(CH_3)_3SiO—[(CH_3)_2SiO]_{10}—Si(CH_3)_3$, and 42 parts by mass of trimethylsiloxysilicate containing $(CH_3)_3SiO_{1/2}$ unit and $SiO_2$ unit [$(CH_3)_3SiO_{1/2}$ unit/$SiO_2$ unit=0.58 (molar ratio), the content of hydroxyl groups bonded to silicon atom was 0.9 mass %, and the hydroxyl groups bonded to silicon atom were present as $(HO)SiO_{3/2}$ unit, $(HO)_2SiO_{2/2}$ unit, or $(HO)_3SiO_{1/2}$ unit]. The mixture was subjected to the condensation reaction between the dimethylpolysiloxane having hydroxy groups at both terminals and the trimethylsiloxysilicate at 25° C. for 15 hours in 18 parts by mass of toluene by adding 0.5 parts by mass of ammonia water. Then, the toluene and water generated by the condensation reaction were distilled off at normal pressure. Thus, a mixture (A-7) was obtained.

* Physical properties of A-7: viscosity=6,220 mPa·s, refractive index=1.406, specific gravity=1.035, volatile content (105° C./3 h)=1.6%

[A-8]

A mixture was prepared from 40 parts by mass of dimethylpolysiloxane shown by $(CH_3)_3SiO—[(CH_3)_2SiO]_{10}—Si(CH_3)_3$ and 60 parts by mass of trimethylsiloxysilicate containing $(CH_3)_3SiO_{1/2}$ unit and $SiO_2$ unit [$(CH_3)_3SiO_{1/2}$ unit/$SiO_2$ unit=0.85 (molar ratio), the content of hydroxyl groups bonded to silicon atom was 1.5 mass %, and the hydroxyl groups bonded to silicon atom were present as (Ho) $SiO_{3/2}$ unit, $(HO)_2SiO_{2/2}$ unit, or $(HO)_3SiO_{1/2}$ unit] in 25 parts by mass of toluene. Then, the toluene was distilled off under reduced pressure. Thus, a mixture (A-8) was obtained.

* Physical properties of A-8: viscosity=7,400 mPa·s, refractive index=1.409, specific gravity=1.088, volatile content (105° C./3 h)=1.9%

[A-9]

Amino-modified polysiloxane (A-9) was used for the evaluation (available as KF-867S from Shin-Etsu Chemical Co., Ltd.).

* Physical properties of A-9: viscosity=1,240 mPa·s, amino group equivalent=1,700 g/mol, refractive index=1.407, specific gravity=0.976, volatile content (105° C./3 h)=3.0%

Additionally, the following other components were used.
[C-1] NOIGEN XL-40 (product name: manufactured by DSK Co., Ltd., polyoxyalkylene decyl ether, HLB=10.5)
[C-2] NOIGEN XL-400D (product name: manufactured by DSK Co., Ltd., 65% aqueous solution of polyoxyalkylene decyl ether, HLB=18.4)
[C-3] SANNONIC SS-120 (product name: manufactured by Sanyo Chemical Industries, Ltd., polyoxyethylene lauryl ether, HLB=14.5)
[D] ion-exchanged water
[E-1] Proxel-BDN (product name: manufactured by Arch Chemicals Inc.) [preservative]
[E-2] lactic acid [pH adjuster]
[E-3] IP SOLVENT 1620 (product name: manufactured by Idemitsu Kosan Co., Ltd.) [hydrocarbon-based solvent]

Examples 1 to 7, Comparative Examples 1 to 3

[A-1] to [A-9] described above were emulsified and dispersed using a homomixer to obtain emulsion compositions in Table 1. Note that the volume-based average particle sizes thereof were measured using a laser diffraction/scattering particle size distribution analyzer LA-960 manufactured by HORIB Ltd.

The emulsions prepared in Examples 1 to 6 and Comparative Examples 1 to 3 were each diluted with ion-exchanged water such that the non-volatile content (105° C./3 h) was 5%. The solution of Example 7 was diluted with [E-3] such that the non-volatile content (105° C./3 h) was 5%. Then, using a dropper, three drops of each emulsion were put on a black test board coated with an aminoalkyd resin. The black test board was rubbed with a microfiber cloth. In this manner, test pieces were prepared. During the rubbing, the spreadability and the evenness on the coating film surface were evaluated according to three criteria of A, B, and C. In addition, the water contact angle (5 μL) and water sliding angle (50 μL) of the prepared test pieces were measured using an automatic sliding/contact angle meter DropMaster (DMo-701SA) manufactured by Kyowa Interface Science Co., Ltd. to evaluate the initial water repellency. Then, the test pieces were cleaned with running water for 5 minutes, and the water contact angle (5 μL) and water sliding angle (50 μL) were measured in the same manner to evaluate the long-lasting water repellency. Table 1 shows the results.

TABLE 1

| [Blended amounts: parts by mass] | | Example | | | | | | | Comparative Example | | |
|---|---|---|---|---|---|---|---|---|---|---|---|
| | | 1 | 2 | 3 | 4 | 5 | 6 | 7 | 1 | 2 | 3 |
| Mixture | A-1 | 100 | | | | | | 100 | | | |
| | A-2 | | 100 | | | | | | | | |
| | A-3 | | | 100 | | | | | | | |
| | A-4 | | | | 100 | | | | | | |
| | A-5 | | | | | 100 | | | | | |
| | A-6 | | | | | | 100 | | | | |
| | A-7 | | | | | | | | 100 | | |
| | A-8 | | | | | | | | | 100 | |
| Amino-modified polysiloxane | A-9 | | | | | | | | | | 100 |
| Surfactant | C-1 | 2.8 | 2.8 | 2.8 | 2.8 | 2.8 | 2.8 | | 2.8 | 2.8 | |
| | C-2 | 4.3 | 4.3 | 4.3 | 4.3 | 4.3 | 4.3 | | 4.3 | 4.3 | |
| | C-3 | | | | | | | | | | 10.0 |
| Ion-exchanged water | D | 59.3 | 59.3 | 59.3 | 59.3 | 59.3 | 59.3 | | 59.3 | 59.3 | 220.0 |

TABLE 1-continued

| [Blended amounts: parts by mass] | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Other components | E-1 | 0.15 | 0.15 | 0.15 | 0.15 | 0.15 | 0.15 | | 0.15 | 0.15 | 0.3 |
| | E-2 | | | | | | | | | | 3.0 |
| | E-3 | | | | | | | 400 | | | |
| Non-volatile content [%] (105° C./3 h) | | 59.4 | 58.7 | 58.9 | 59.2 | 59.0 | 59.4 | 19.8 | 58.9 | 59.1 | 32.6 |
| Viscosity (mPa · s) | | 112 | 132 | 160 | 121 | 187 | 165 | 25 | 554 | 280 | 50 |
| Average particle size (nm) | | 690 | 630 | 620 | 660 | 600 | 590 | — | 620 | 630 | 360 |
| Spreadability | | A | A | B | A | A | A | A | A | A | A |
| Coating evenness | | A | A | B | A | A | A | A | B | A | A |
| Initial | water contact angle | 105.3° | 104.1° | 105.9° | 105.5° | 104.7° | 105.2° | 105.8° | 104.8° | 108.3° | 97.2° |
| | water sliding angle | 14.7° | 14.8° | 11.0° | 14.2° | 15.1° | 14.8° | 12.5° | 17.8° | 21.2° | 24.8° |
| Durability | water contact angle | 104.8° | 103.9° | 105.6° | 104.5° | 104.3° | 104.8° | 105.3° | 104.5° | 103.7° | 96.3° |
| | water sliding angle | 16.7° | 15.3° | 12.6° | 15.7° | 15.6° | 15.1° | 13.7° | 19.8° | 23.1° | 27.5° |

[Evaluation Methods]

Spreadability/Sensory Evaluation

A: easy, B: normal, C: hard (heavy)

Coating Evenness/Visual Evaluation

A: even, B: normal, C: uneven

Based on the results in Table 1, the water repellent compositions of Examples 1 to 7 had excellent water contact angle and water sliding angle, that is, excellent initial water repellency and long-lasting water repellency, in comparison with the composition of Comparative Example 1, the composition of Comparative Example 2 where dimethylpolysiloxane and trimethylsiloxysilicate were simply mixed, and the composition of Comparative Example 3 using the amino-modified polysiloxane composition. Moreover, the levels of the spreadability and the coating evenness of any composition seem to cause no problem.

From the foregoing, it has been revealed that the present invention provides a water repellent composition which is effectively used as a water repellent excellent in water repellency, particularly suitably applied as an agent for paintwork and a glass surface of an automobile, and which imparts favorable initial water repellency and long-lasting water repellency.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A water repellent composition comprising
(A) a component that is a condensation reaction product between:
(a) an organopolysiloxane shown by the following general formula (1) and having a hydroxyl group or an alkoxy group at both terminals of a molecular chain of the organopolysiloxane, $$(R^2O)R^1{}_2SiO—(R^1{}_2SiO)_m—SiR^1{}_2(OR^2) \quad (1)$$

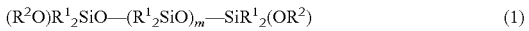

wherein $R^1$ represents an unsubstituted or substituted monovalent hydrocarbon group having 1 to 10 carbon atoms, $R^2$ represents a hydrogen atom or $R^1$, and "m" represents an integer of $5 \leq m \leq 2{,}500$; and
(b) a trialkylsiloxysilicate containing an $R^1{}_3SiO_{1/2}$ unit, an $SiO_2$ unit, and a siloxane unit having a hydroxyl group bonded to a silicon atom, wherein $R^1$ is as defined above, a molar ratio of the $R^1{}_3SiO_{1/2}$ unit/the $SiO_2$ unit is 0.6 to 1.3, and a content of the hydroxyl group is 0.1 or more and less than 2.0 mass %, and
(B) a component that is an organopolysiloxane shown by the following general formula (2), $$R^1{}_3SiO—(R^1{}_2SiO)_n—SiR^1{}_3 \quad (2)$$

wherein $R^1$ is as defined above, and "n" represents an integer of $5 \leq n \leq 1{,}000$.

2. The water repellent composition according to claim 1, comprising an emulsion wherein the component (A) and the component (B) in a total amount of 100 parts by mass are emulsified by 2 to 50 parts by mass of (C) a surfactant and 10 to 2,000 parts by mass of (D) water.

3. The water repellent composition according to claim 2, wherein the emulsion has an average particle size of 100 to 1,000 nm.

4. The water repellent composition according to claim 1, which is used for a body surface of an automobile.

5. The water repellent composition according to claim 2, which is used for a body surface of an automobile.

6. The water repellent composition according to claim 3, which is used for a body surface of an automobile.

* * * * *